Patented Nov. 8, 1932

1,886,931

UNITED STATES PATENT OFFICE

ELLIOT RITCHIE ALEXANDER, OF ORLANDO, FLORIDA, ASSIGNOR, BY MESNE ASSIGNMENTS, TO THE VITAMIN COMPANY OF AMERICA, A CORPORATION OF FLORIDA

VITAMIN FRUIT COMPOSITION

No Drawing. Application filed August 1, 1930. Serial No. 472,489.

This invention relates to vitamin-containing fruit compositions and to processes of preparing the same.

It is known to prepare extracts or concentrates rich in one or more vitamins. However, it has been the common experience that these vitamin concentrates or extracts often are ill-tasting, or unpleasantly odoriferous, or of an unappetizing appearance, and hence not readily receivable by man. Also it is generally understood by those skilled in the art to which this invention appertains that the potency or therapeutic effectiveness of vitamins, including especially vitamin concentrates and extracts thereof, may be destroyed by some one or more of several agencies including light, heat, oxidizing agents, moisture and alkalinity, and therefore such concentrates and extracts cannot be considered to be stable. This natural instability of vitamins to influences such as heat, oxidizing gases, and the like, offers a logical explanation why, in reducing the bulk of an animal or vegetable material known to contain a vitamin or vitamins, the vitamin-potency usually is lost or destroyed by reason of the influences occasioned by the operations incident to that reduction in bulk.

An object of the invention is to provide a palatable, readily-acceptable, food or confection artificially enriched in its content of vitamins. Another object is to provide such a product containing in predetermined dosages a plurality of vitamins in vitamically activated condition. Other objects of the invention include the provision of a vitamin-enriched food or confection containing in addition to its content of vitamins a vitamin-preserving and vitamin-activating agent. An additional object is the provision of a process of stabilizing and preserving vitamin extracts in such form that they readily yield their vitamin properties when taken into the human system.

The above and other objects of invention I have attained by associating a vitamin extract, or extracts, containing a plurality of vitamins, with a preserving and/or activating delectable menstruum or medium of fruit mass equivalent in chemical effect to natural ingredients of citrus fruit. Among such operable fruits are, in addition to the citrus fruits oranges, lemons, grapefruit, tangerines, and kumquats, fruits rich in fruit acid or acid salts of fruit acids, fruit sugar, and essential oils, including pineapple, apricots and dates. In general I include as operable menstruum of my vitamin extract composition any edible mass approximating the constitution of citrus fruit; that is to say, a mass containing in substantial amounts fruit acids or acid salts of fruit acids, fruit sugars, essential oils and pectin. Specifically, and as a preferred embodiment, the invention includes the provision of a palatable food composition consisting essentially of a mixture of vitamin extracts incorporated in a menstruum of citrus fruit mass which latter may or may not contain also a small but effective amount of a perservative against fermentation and/or added sugar.

It is not now known with certainty to what single ingredient, or to what ingredients, of the fruits may properly be attributed the properties of stabilizing and preserving admixed vitamin extracts and/or of activating the same. It is certain, however, that the above naturally-occurring fruits, either fresh, crystallized with added sugar, or dehydrated, are capable of accomplishing these desirable results, and that a citrus fruit-simulating mass as aforesaid is operable in like relation. By the expression "preserving" is here meant the act of inhibiting or checking loss of potency of the vitamin extracts. The expression "activating" is here used in the sense in which this term is used in biological chemistry, and as illustrated in the treatment of pepsin with dilute hydrochloric acid.

The vitamin extracts to be incorporated in the composition may be so selected with respect to their contents of the various vitamins that the resulting composition may be richer in a particular vitamin than in the others, or may have a predominating content of two or more vitamins, as desired. Also, the proportion of vitamin extracts to fruit mass may be widely varied as desired. Thus, by way of illustration, for one part by weight of the mixture of vitamin extracts I may use from one to three parts by weight of the fruit mass. Preferably, the vitamin extracts used are those obtained from the richest sources of vitamins and may be chosen from, among others, vitamin extracts from the following known sources (the list being merely illustrative): yeast; lemon; orange; grapefruit; spinach; cabbage; lettuce; parsley; carrot; tomato; alfalfa; wheat embryo; cod liver oil; raw fresh liver; egg yolk; butter, and fat of heart, liver or kidney.

In carrying out the process of my invention, any fruit rich in fruit acid (or alkaline-earth metal acid salts of fruit acids), invert sugar, essential oils and pectin is crystallized in sugar or dehydrated, or if used fresh is treated with a small but effective amount of a suitable preservative such, for instance, as sodium benzoate, and the resulting fruit product is reduced to a very fine pulp or fruit mass in known manner: one or more vitamin extracts, for example, extracts of vitamins from cod liver oil, wheat embryo, and yeast, for instance, in dried form, and in amounts pre-determined with relation to the amount of fruit mass to assure a dosage of therapeutic effect; for example, 16 grams of the aforesaid mixture to a fruit mass of 12 grams of dehydrated citrus fruit and 12 grams of crystallized citrus fruit, are thoroughly mixed and the mixture of vitamin extracts is incorporated into the fruit mass with stirring until a fine homogeneous mass is obtained. The resulting product, which itself may constitute an article of commerce, may if desired be rolled into sheets and cut into shapes or may be compressed, molded, or otherwise formed into cakes, tablets or such other appropriate shapes as the use to which the same is to be put may dictate. Formed shapes of the composition may be given an air-excluding protective coating of chocolate, or of sugar, if desired; or, the composition may be dispensed as a shape or body wrapped in waxed paper, tin-foil, or another material not injurious to the composition and known to be useful in preventing contact of a foodstuff or confection with the atmosphere.

The said composition, which as will be evident is extremely rich in vitamins, is an attractive confection having a palatable flavor, is readily accepted by man, and is pleasantly free from the objections as to taste, odor, appearance, and the like, which obtain with respect to the sources of the vitamins. Of greater importance; the composition keeps well, the vitamin extracts being not only preserved but also activated or brought into and maintained in a form in which they the most readily give up their vitamic qualities when taken into the human system. The use of fruit mass as the artificial menstruum for the vitamin extract or extracts provides an environment for the latter closely approximating that in which it or they occurred originally, but without a detrimental amount of water being present.

This application is a continuation-in-part of my application Serial No. 367,628, filed May 31, 1929, for "vitamin fruit composition".

I claim:

1. Process of preserving a concentrated vitamin extract which comprises incorporating the extract into a vitamin-preserving acidic fruit mass.

2. Process of preserving a concentrated vitamin extract which comprises incorporating the extract into a citrus fruit mass.

3. Process which comprises subjecting fresh fruit containing fruit acid, invert sugar, essential oils and pectin to fermentation-inhibiting treatment, reducing the treated fruit to a fine pulp, and incorporating into the pulp, with stirring, a concentrated vitamin extract.

4. Process of producing a stable food composition containing in pre-determined proportion and concentration a plurality of selected vitamins which comprises incorporating into a vitamin-preserving acidic fruit mass a plurality of concentrated extracts containing the selected vitamins.

5. Process which comprises reducing to a fine pulp three parts by weight of a mixture of crystallized citrus fruit and dehydrated citrus fruit, separately mixing a plurality of vitamin extracts in dry form totaling two parts by weight, and incorporating the mixture of extracts into the pulp with stirring until a homogeneous composition results.

6. Process of preserving concentrated vitamin extracts which comprises incorporating the same into acidic fruit masses, forming the masses into shapes, and sealing the shapes from contact with air by surrounding the same with air-impervious coverings.

7. Process of preserving concentrated vitamin extracts which comprises incorporating the same into acidic fruit masses, forming the masses into shapes, and sealing the shapes from contact with air by coating the same with a chocolate composition.

8. As a new product, a composition consisting essentially of a concentrated vitamin extract in homogeneous admixture with acidic fruit mass.

9. As a new product, a composition consisting essentially of a concentrated vitamin extract in homogeneous admixture with citrus fruit mass.

10. As a new product, a composition consisting essentially of one part by weight of a mixture of vitamin extracts in dry form in homogeneous admixture with citrus fruit mass in an amount from one to three parts by weight.

11. As a new product, a body of composition consisting essentially of at least one concentrated vitamin extract in homogeneous admixture with acidic fruit mass and an air-excluding coating surrounding the body.

12. As a new product, a body of composition consisting essentially of at least one concentrated vitamin extract in homogeneous admixture with acidic fruit mass and an air-excluding coating of chocolate composition surrounding the body.

13. As a new product, a body of composition consisting essentially of at least one concentrated vitamin extract in homogeneous admixture with citrus fruit mass and an air-excluding coating surrounding the body.

14. As a new product, a body of composition consisting essentially of at least one concentrated vitamin extract in homogeneous admixture with citrus fruit mass and an air-excluding coating of chocolate composition surrounding the body.

15. A stable, edible, food composition consisting essentially of a homogeneous mixture of a vitamin-preserving acidic fruit mass and a plurality of concentrated vitamin extracts providing in predetermined concentration a selected combination of vitamins.

In testimony whereof, I affix my signature.

ELLIOT RITCHIE ALEXANDER.